Patented Jan. 25, 1949

2,460,243

UNITED STATES PATENT OFFICE 2,460,243

PRODUCTION OF NITRO OLEFINES

Charles William Scaife, Norton-on-Tees, and Arthur Ernest Wilder Smith, Wallingford, England, and Harold Baldock, deceased, late of Norton-on-Tees, England, by Herbert Baldock, legal representative, Norton-on-Tees, England, assignors to Imperial Chemical Industries Limited, a corporation of Great Britain No Drawing. Application December 10, 1945, Serial No. 634,147. In Great Britain December 11, 1944

2 Claims. (Cl. 260—644)

This invention relates to the production of nitro-olefines.

It has been disclosed in U. S. Patent No. 2,384,049 that polymerised nitroethylene is formed by reacting β-nitroethyl nitrate with certain basic substances in the presence of an aqueous medium, the reaction being carried out at various temperatures.

According to the present invention there is provided a process for the production of nitro olefines with at least three carbon atoms from the mono-nitro derivatives of the nitrates of saturated aliphatic hydrocarbons containing at least three carbon atoms, or of saturated alicyclic hydrocarbons containing at least five carbon atoms in the ring, or of saturated aliphatic-alicyclic hydrocarbons containing at least five carbon atoms in the ring, in all of which the nitro and nitrate groups are attached to adjacent carbon atoms and the former carbon atom has attached thereto at least one active hydrogen atom, which comprises treating them in the presence of water with a basic substance such as the oxides (where they exist), hydroxides, carbonates (including bicarbonates and basic carbonates where they exist) of the alkali metals, ammonium, alkaline earth metals, magnesium, lead, and the oxide, hydroxide, carbonate and basic carbonate of zinc. The process of the invention is particularly applicable to the production of nitro-olefines of the above types containing up to eight carbon atoms. The nitro-olefine is generally obtained as the substantially pure monomer, but from the nitrate ester of 1-nitro propanol-2 there is obtained the polymer of nitro propylene.

Those basic substances freely soluble in water are preferred because they give a faster reaction. Preferably the basic substance is used in a proportion equivalent to one mole of nitric acid produced per mole of nitro/nitrate compound, although larger quantities than this may also be used. When a mixture of basic substances is used an amount of the mixture equivalent to one mole of nitric acid produced per mole of nitro/nitrate compound should be used.

The basic substances may be used in solution or in suspension. The preferred basic substances are the stronger bases, for example, the oxides and hydroxides of the alkali metals. For general purposes the preferred basic substance is sodium hydroxide, which may be used, for example, in a concentration of 2 N or less. Ammonium bicarbonate gives good results with the nitropropyl nitrates and also with nitro tertiary butyl nitrate.

The reaction may be conducted either at room temperature or in the warm. A reaction temperature of about 20° C. is very suitable. Temperatures approaching the boiling point of water should be avoided since they tend to cause undesirable decomposition of the nitro/nitrate compound and/or mononitro-olefine. It is convenient to operate at atmospheric pressure, but higher pressures may be employed if desired.

The monomeric nitro-olefines can be separated from the reaction products by extracting the latter several times with a volatile solvent, e. g. methyl ether or ethyl acetate, drying the extract, e. g. over sodium sulphate, removing the solvent by distillation, and distilling the residue under reduced pressure.

It will generally be desirable to carry out the reaction in the presence of an excess of water relative to the nitro/nitrate compound. Good results are obtained by using water as the sole medium and employing the nitro/nitrate compound as a dispersion therein, but a solvent for the nitro/nitrate may be present if desired. It is desirable to stir the mixture during the course of the reaction.

Examples of nitro-olefines that may be produced according to the process of the present invention are polynitropropylene from 1-nitro 2-propanol nitrate, α-nitroisobutene from nitro-tertiary butyl nitrate and 1-nitro cyclohexene-1 from the nitrate ester of 1-nitro cyclohexanol-2.

The invention is illustrated but not limited by the following examples.

Example 1

To 4.92 gms. of nitro-tertiary butyl nitrate suspended in 15 mls. of water was slowly added 1.21 gms. of sodium hydroxide in 50 mls. of water, the whole being kept at a temperature of about 15° C. and stirred the while. After stirring for a further ½ hour the liquid was extracted with ethyl acetate and 1.85 gms. of α-nitroisobutene was recovered from the latter by vacuum distillation.

Example 2

To 5 gms. of the nitrate ester of 1-nitro 2-propanol suspended in 50 mls. of methanol was slowly added 2.7 gms. of ammonium bicarbonate dissolved in 50 mls. of water, the whole being kept at a temperature of about 15° C. and stirred. After stirring for a further 15 minutes the solution was acidified with dilute hydrochloric acid and the polynitropropylene, which had precipitated, separated by filtration. This was washed with water and dried to give 1.9 gms. of polynitropropylene.

We claim:

1. A process for the production of nitro-isobutene which comprises reacting nitro-tertiary butyl nitrate with sodium hydroxide in an aqueous medium.

2. A process for the production of nitro-aliphatic olefines containing from four to eight carbon atoms which comprises reacting a nitrate of a saturated nitro-aliphatic hydrocarbon of from four to eight carbon atoms, in which the nitro and nitrate groups are on adjacent carbon atoms, the former carbon atom also having a hydrogen atom attached thereto, in an aqueous medium with a substance selected from the group consisting of alkali metal carbonates, bicarbonates, hydroxides; alkaline earth metal carbonates, bicarbonates, hydroxides; and ammonium carbonate, bicarbonate, hydroxide.

CHARLES WILLIAM SCAIFE.
ARTHUR ERNEST WILDER SMITH.
HERBERT BALDOCK,
Legal Representative of Harold Baldock,
Deceased.

REFERENCES CITED

The following references are of record in the file of this patent:

UNITED STATES PATENTS

| Number | Name | Date |
|---|---|---|
| 2,257,980 | Schwarz | Oct. 7, 1941 |
| 2,384,049 | Smith et al. | Sept. 4, 1945 |